United States Patent
Sugawara et al.

(10) Patent No.: US 12,423,206 B2
(45) Date of Patent: Sep. 23, 2025

(54) COMMUNICATION SYSTEM, RELAY DEVICE, AND DIAGNOSIS TARGET DEVICE

(71) Applicants: TOYOTA JIDOSHA KABUSHIKI KAISHA, Toyota (JP); DENSO CORPORATION, Kariya (JP)

(72) Inventors: Shinnosuke Sugawara, Toyota (JP); Tokuya Inagaki, Kariya (JP); Shogo Watanabe, Kariya (JP); Ryosuke Murakami, Kariya (JP)

(73) Assignees: TOYOTA JIDOSHA KABUSHIKI KAISHA, Toyota (JP); DENSO CORPORATION, Kariya (JP)

( * ) Notice: Subject to any disclaimer, the term of this patent is extended or adjusted under 35 U.S.C. 154(b) by 5 days.

(21) Appl. No.: 18/485,559

(22) Filed: Oct. 12, 2023

(65) Prior Publication Data

US 2024/0176720 A1    May 30, 2024

(30) Foreign Application Priority Data

Nov. 30, 2022  (JP) .................................. 2022-191359

(51) Int. Cl.
*G06F 11/00* (2006.01)
*G06F 11/32* (2006.01)
*G06F 21/50* (2013.01)

(52) U.S. Cl.
CPC ............ *G06F 11/321* (2013.01); *G06F 21/50* (2013.01)

(58) Field of Classification Search
CPC ..... G06F 11/321; G06F 21/50; G06F 11/3055
USPC ....................................................... 714/1–57
See application file for complete search history.

(56) References Cited

U.S. PATENT DOCUMENTS

| | | | | |
|---|---|---|---|---|
| 7,774,641 B2 * | 8/2010 | Inoue | .................... | G06F 11/201 714/5.11 |
| 11,711,430 B2 * | 7/2023 | Gustafson | ............. | G06F 11/324 714/1 |
| 2010/0306584 A1 * | 12/2010 | Nishimura | ............ | G06F 9/4411 714/15 |
| 2013/0246863 A1 * | 9/2013 | Myrah | ................ | G06F 11/0745 714/48 |
| 2015/0205658 A1 * | 7/2015 | Towata | .................... | G06F 11/30 714/47.3 |
| 2015/0242266 A1 * | 8/2015 | Kori | ..................... | G06F 11/0721 714/57 |
| 2015/0293799 A1 * | 10/2015 | Sekine | .................. | B66B 5/0006 714/37 |

(Continued)

FOREIGN PATENT DOCUMENTS

JP    2016-096375 A    5/2016

*Primary Examiner* — Sarai E Butler
(74) *Attorney, Agent, or Firm* — Oliff PLC

(57) ABSTRACT

A communication system includes a relay device and a diagnosis target device. The relay device includes a port configured to connect a diagnostic tool. The diagnosis target device is connected to the relay device via a bus. When the diagnosis target device has received specific data whose source appears to be the diagnostic tool, the diagnosis target device sends an inquiry signal for inquiring of the relay device about a monitoring result for the specific data. The relay device determines in response to the inquiry signal whether the specific data is legitimate data from the diagnostic tool. The relay device sends the monitoring result including a determination result to the diagnosis target device.

12 Claims, 5 Drawing Sheets

(56) References Cited

U.S. PATENT DOCUMENTS

| | | | |
|---|---|---|---|
| 2016/0124835 A1* | 5/2016 | Davis | G06F 11/3664 714/38.1 |
| 2020/0073751 A1* | 3/2020 | Sampei | G06F 11/3027 |
| 2022/0206909 A1* | 6/2022 | Ishikawa | G06F 11/2028 |

* cited by examiner

COMMUNICATION SYSTEM, RELAY DEVICE, AND DIAGNOSIS TARGET DEVICE

CROSS-REFERENCE TO RELATED APPLICATION

This application claims priority to Japanese Patent Application No. 2022-191359 filed on Nov. 30, 2022, incorporated herein by reference in its entirety.

BACKGROUND

1. Technical Field

The present disclosure relates to communication systems, relay devices, and diagnosis target devices.

2. Description of Related Art

Japanese Unexamined Patent Application Publication No. 2016-096375 (JP 2016-096375 A) describes a communication system. The communication system includes a bus connecting a plurality of devices. Each device uses a common key and a message authentication code for data that is sent and received via the bus in order to prevent an unauthorized access due to data falsification and spoofing.

In such a communication system as described in JP 2016-096375 A, a diagnostic tool is sometimes connected to a relay device that relays data. Connecting the diagnostic tool in this manner allows various types of data etc. related to diagnosis to be sent and received between the diagnostic tool and each device connected to the bus. However, such a function may be abused, and illegal data pretending to be data from the diagnostic tool may be input to each device via the bus. Such an unauthorized access prevention technique using a common key and a message authentication code as described in JP 2016-096375 A can prevent such illegal data from being sent and received. However, the technique using a common key and a message authentication code increases the processing load on each device. Therefore, apart from the technique using a common key and a message authentication code, there is a demand for an unauthorized access prevention technique with a lower processing load.

SUMMARY

According to one aspect of the present disclosure, a communication system includes: a relay device including a port configured to connect a diagnostic tool; and a diagnosis target device connected to the relay device via a bus. The diagnosis target device is configured to, when the diagnosis target device has received specific data whose source appears to be the diagnostic tool, send an inquiry signal for inquiring of the relay device about a monitoring result for the specific data. The relay device is configured to: determine in response to the inquiry signal whether the specific data is legitimate data from the diagnostic tool; and send the monitoring result including a determination result to the diagnosis target device.

According to the above configuration, the relay device determines whether the specific data is the legitimate data, in response to the inquiry signal received from the diagnosis target device. That is, the relay device can be aware of the data to be monitored and the timing to monitor the data, based on the inquiry signal. This configuration can reduce an unnecessary increase in processing load on the relay device in terms of reducing unauthorized accesses. According to the above embodiment, when the diagnosis target device has received the specific data whose source appears to be the diagnostic tool, the diagnosis target device can receive the monitoring result including the determination result as to whether the received specific data is the legitimate data. Therefore, in case that the specific data is spoofed data with a falsified source, the diagnosis target device can also be aware of this.

According to another aspect of the present disclosure, a relay device includes a port configured to connect a diagnostic tool. The relay device is configured to: when the relay device has received, from a diagnosis target device to be diagnosed by the diagnostic tool, an inquiry signal for inquiring about a monitoring result for specific data whose source appears to be the diagnostic tool, determine whether the specific data is legitimate data from the diagnostic tool; and send the monitoring result including a determination result to outside via a communication bus different from the port.

According to the above configuration, the relay device determines whether the specific data is the legitimate data, in response to the inquiry signal received from the diagnosis target device. That is, the relay device can be aware of the data to be monitored and the timing to monitor the data, based on the inquiry signal. This configuration can reduce an unnecessary increase in processing load on the relay device in terms of reducing unauthorized accesses.

According to still another aspect of the present disclosure, a diagnosis target device is configured to: connect via a bus to a relay device including a port configured to connect a diagnostic tool in order for the diagnosis target device to be diagnosed by the diagnostic tool; and when the diagnosis target device has received specific data whose source appears to be the diagnostic tool, send an inquiry signal for inquiring of the relay device about a monitoring result for the specific data.

According to the above configuration, when the diagnosis target device has received the specific data whose source appears to be the diagnostic tool, the diagnosis target device can receive the monitoring result including the determination result as to whether the specific data is the legitimate data. Therefore, in case that the specific data is spoofed data with a falsified source, the diagnosis target device can also be aware of this.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Embodiment

An embodiment of a communication system will be described below with reference to the drawings. The following description illustrates a vehicle equipped with the communication system.

Overview of Communication System

Figure 1:
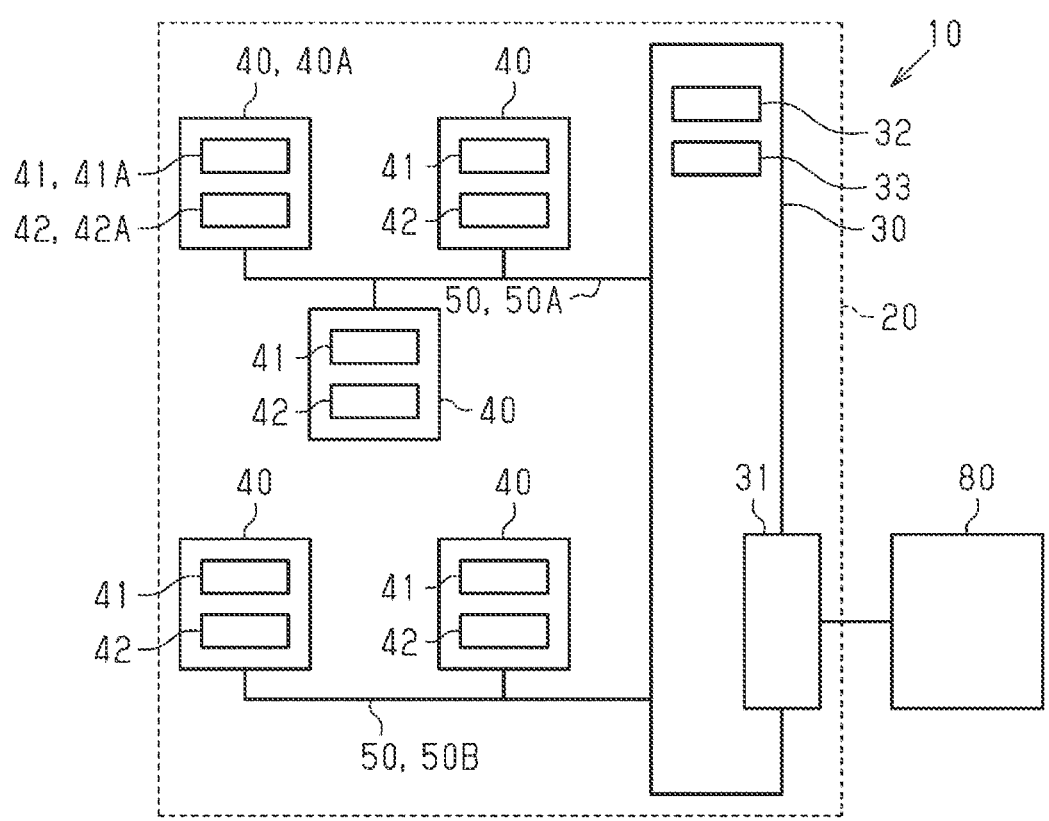
FIG. 1 is a schematic diagram of a communication system according to an embodiment.

As shown in FIG. 1, a vehicle 10 includes a communication system 20. The communication system 20 includes a relay device 30 and a plurality of control devices 40. The relay device 30 and each control device 40 are connected via a communication bus 50.

In the present embodiment, three control devices 40 are connected to the relay device 30 via a first bus 50A. Two control devices 40 are connected to the relay device 30 via a second bus 50B.

The control devices 40 control actuators mounted on the vehicle 10. Each control device 40 includes an execution unit 41 and a storage unit 42. The execution unit 41 is a central processing unit (CPU). The storage unit 42 is a read-only memory (ROM) and a random access memory (RAM). The storage unit 42 stores parameters indicating the communication state of the control device 40. The communication state indicates a locked state or an unlocked state. The locked state is a state in which communication of specific data SD whose source appears to be a diagnostic tool 80 is disabled. The unlocked state is a state in which the locked state is cancelled, that is, a state in which various types of communication including communication of the specific data SD are enabled. The storage unit 42 stores various programs. The execution unit 41 is configured to execute the various programs stored in the storage unit 42. The execution unit 41 implements the following control functions for the actuator by executing these programs.

For example, one of the control devices 40 controls an engine of the vehicle 10. For example, one of the control devices 40 controls a brake of the vehicle 10. For example, one of the control devices 40 controls a steering system of the vehicle 10. For example, one of the control devices 40 controls locking and unlocking of a door of the vehicle 10.

The relay device 30 relays data that is sent and received via each bus 50. For example, it is assumed that data is sent from the control device 40 connected to the first bus 50A to the control device 40 connected to the second bus 50B. In this case, the relay device 30 receives the data via the first bus 50A and sends the received data via the second bus 50B. The relay device 30 includes a port 31 for connecting the diagnostic tool 80. Signals from the diagnostic tool 80 are input to the port 31. Signals for the diagnostic tool 80 are sent from the port 31. The diagnostic tool 80 is a tool for diagnosing at least one of the control devices 40 at, for example, a repair shop such as a dealership.

The relay device 30 includes an execution unit 32 and a storage unit 33. The execution unit 32 is a CPU. The storage unit 33 is a ROM and a RAM. The storage unit 33 stores various programs. The execution unit 32 is configured to execute the various programs stored in the storage unit 33. The execution unit 32 implements the following communication functions by executing these programs.

The relay device 30 is configured to receive a message sent according to a first communication standard from the diagnostic tool 80 via the port 31. The relay device 30 can convert the protocol of the received message according to the first communication standard to a second communication standard and send the resultant message to the destination control device 40 via the bus 50. That is, the relay device 30 functions as a so-called gateway.

The relay device 30 is also configured to receive a message according to the second communication standard from the control device 40 via the bus 50. The relay device 30 can convert the protocol of the received message according to the second communication standard to the first communication standard and send the resultant message to the diagnostic tool 80 from the port 31.

It is herein assumed that one of the control devices 40 that is to be diagnosed by the diagnostic tool 80 is a diagnosis target device 40A. The diagnosis target device 40A is therefore configured to be connected to the relay device 30 via the bus 50. Messages containing diagnostic data are communicated between the diagnostic tool 80 and the diagnosis target device 40A. Specifically, when conducting a diagnosis using the diagnostic tool 80, the diagnostic tool 80 sends a message containing request data RQ out of the diagnostic data to the port 31.

When the relay device 30 receives the request data RQ, the relay device 30 sends the received message containing the request data RQ to the diagnosis target device 40A external to the relay device 30 via the bus 50. When the diagnosis target device 40A receives the request data RQ, the diagnosis target device 40A outputs response data RP in response to the request data RQ. The diagnosis target device 40A sends a message containing the response data RP to the relay device 30 via the bus 50. The relay device 30 sends the received message containing the response data RP from the port 31 to the diagnostic tool 80. The diagnostic tool 80 diagnoses the diagnosis target device 40A based on the response data RP. The request data RQ is an example of the specific data SD.

Inquiry and Locked State of Diagnosis Target Device

A storage unit 42A of the diagnosis target device 40A stores an inquiry program for inquiring whether the specific data SD is legitimate data CD. The specific data SD is data whose source appears to be the diagnostic tool 80. An execution unit 41A of the diagnosis target device 40A executes this program every time the execution unit 41A receives a message via the bus 50. The execution unit 41 of the diagnosis target device 40A is referred to as "execution unit 41A," and the storage unit 42 of the diagnosis target device 40A is referred to as "storage unit 42A."

Figure 2:
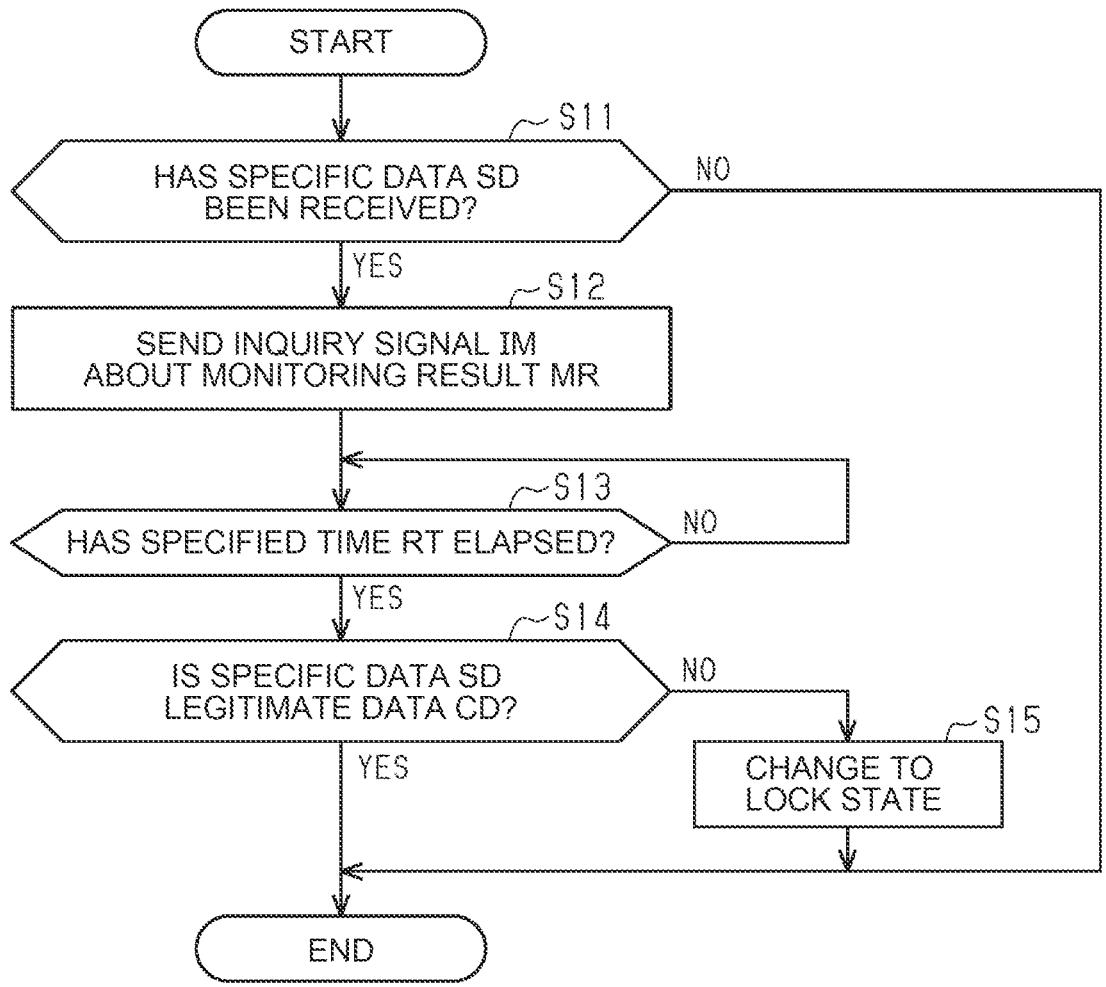
FIG. 2 is a flowchart of a series of steps that is performed by a diagnosis target device.

As shown in FIG. 2, when the execution unit 41A has started executing the inquiry program, the execution unit 41A first performs step S11. In step S11, the execution unit 41A determines whether data contained in the received message is specific data SD. That is, the execution unit 41A determines whether it has received specific data SD. The specific data SD is data whose source appears to be the diagnostic tool 80. In the present embodiment, the specific data SD is request data RQ. That is, in step S11, the execution unit 41A determines whether it has received request data RQ as specific data SD.

As used herein, the "specific data SD" refers to data contained in a message and containing information identifying the diagnostic tool 80 as a source. Therefore, the "specific data SD" includes not only data whose source is actually the diagnostic tool 80 but also data pretending to be data whose source is the diagnostic tool 80.

When the execution unit 41A has not received specific data SD (S11: NO), the execution unit 41A ends the current series of steps. When the execution unit 41A has received specific data SD (S11: YES), the process proceeds to step S12.

In step S12, the execution unit 41A sends an inquiry signal IM for inquiring of the relay device 30 about a monitoring result MR for the specific data SD received in step S11. The process then proceeds to step S13.

In step S13, the execution unit 41A determines whether a predetermined specified time RT has elapsed since it sent the inquiry signal IM in step S12. When the specified time RT has not elapsed (S13: NO), the execution unit 41A repeats step S13. When the specified time RT has elapsed (S13: YES), the process proceeds to step S14. As will be described later, the execution unit 41A receives during the specified time RT the monitoring result MR including a determination result JR as to whether the specific data SD for which the execution unit 41A has inquired of the relay device 30 about the monitoring result MR is legitimate data CD.

In step S14, the execution unit 41A determines whether the specific data SD for which the execution unit 41A has inquired about the monitoring result MR is legitimate data CD. Specifically, the execution unit 41A determines whether the determination result JR included in the monitoring result MR received during the specified time RT indicates that the specific data SD is legitimate data CD. When the determination results JR included in all of a plurality of the monitoring results MR received during the specified time RT indicate that the specific data SD is legitimate data CD, the execution unit 41A determines that the specific data SD is legitimate data CD. On the other hand, when there is at least one piece of data indicating that the specific data SD is not legitimate data CD, the execution unit 41A determines that the specific data SD is not legitimate data CD. When the execution unit 41A has not received any monitoring result MR during the specified time RT, the execution unit 41A also determines that the specific data SD is not legitimate data CD.

When the execution unit 41A determines that the specific data SD is legitimate data CD (S14: YES), the execution unit 41A ends the current series of steps. In this case, the execution unit 41A performs communication etc. as usual according to the specific data SD. On the other hand, when the execution unit 41A determines that the specific data SD is not legitimate data CD (S14: NO), the process proceeds to step S15.

In step S15, the execution unit 41A changes the communication state of the diagnosis target device 40A to the locked state in which communication of the specific data SD is disabled. Specifically, the execution unit 41A changes the parameter stored in the storage unit 42A and indicating the communication state to the parameter indicating the locked state. As a result, the diagnosis target device 40A changes to the state in which the diagnosis target device 40A is unable to receive the specific data SD, that is, the data whose source appears to be the diagnostic tool 80. The execution unit 41A then ends the current series of steps.

Series of Steps Related to Monitoring by Relay Device

Next, a series of steps related to monitoring by the relay device 30 will be described. The storage unit 33 stores a monitoring result transmission program for sending a monitoring result MR. The storage unit 33 also stores the following two programs as programs for determining specific data SD: a request data determination program and a response data determination program. The request data determination program is a program for determining specific data SD based on request data RQ. The response data determination program is a program for determining specific data SD based on response data RP sent in response to request data RQ. The execution unit 32 executes the monitoring result transmission program when the execution unit 32 has received an inquiry signal IM.

Figure 3:
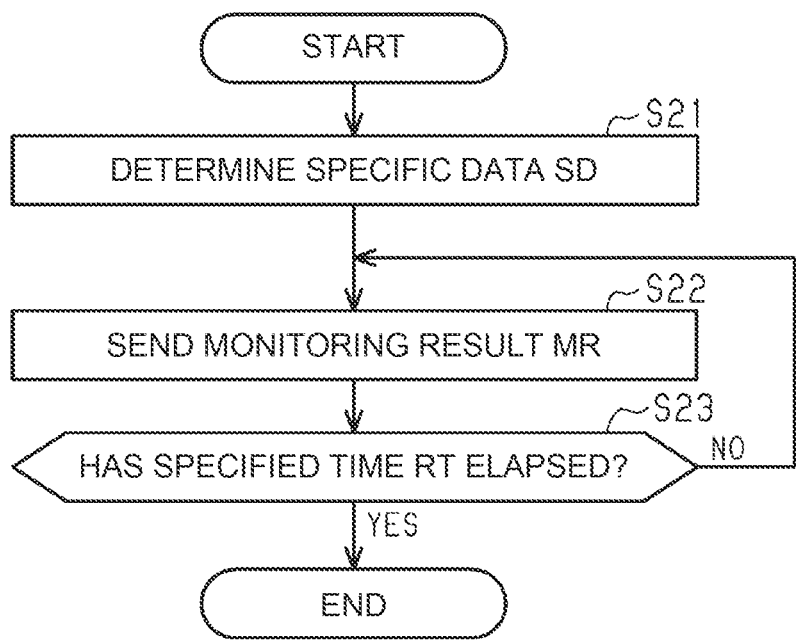
FIG. 3 is a flowchart of a series of steps related to monitoring by a relay device.

As shown in FIG. 3, when the execution unit 32 has started executing the monitoring result transmission program, the execution unit 32 first performs step S21. In step S21, the execution unit 32 determines whether the specific data SD for which the execution unit 32 has been inquired about a monitoring result MR by the inquiry signal IM is legitimate data CD from the diagnostic tool 80. Specifically, the execution unit 32 executes the request data determination program and the response data determination program that are stored in the storage unit 33. Processing by each program will be described later. The execution unit 32 thus acquires a determination result JR as to whether the specific data SD is legitimate data CD. The process then proceeds to step S22.

In step S22, the execution unit 32 sends a monitoring result MR including the determination result JR acquired in step S22 to all the control devices 40 to be diagnosed that are connected to the relay device 30 via the same bus 50 as the diagnosis target device 40A. The process then proceeds to step S23.

In step S23, the execution unit 32 determines whether a predetermined specified time RT has elapsed since step S21 was started. When the specified time RT has not elapsed (S23: NO), the process returns to step S22. That is, the execution unit 32 repeatedly sends a monitoring result MR until the specified time RT elapses. When the specified time RT has elapsed (S23: YES), the execution unit 32 ends the current series of steps.

Monitoring of Request Data

Figure 4:
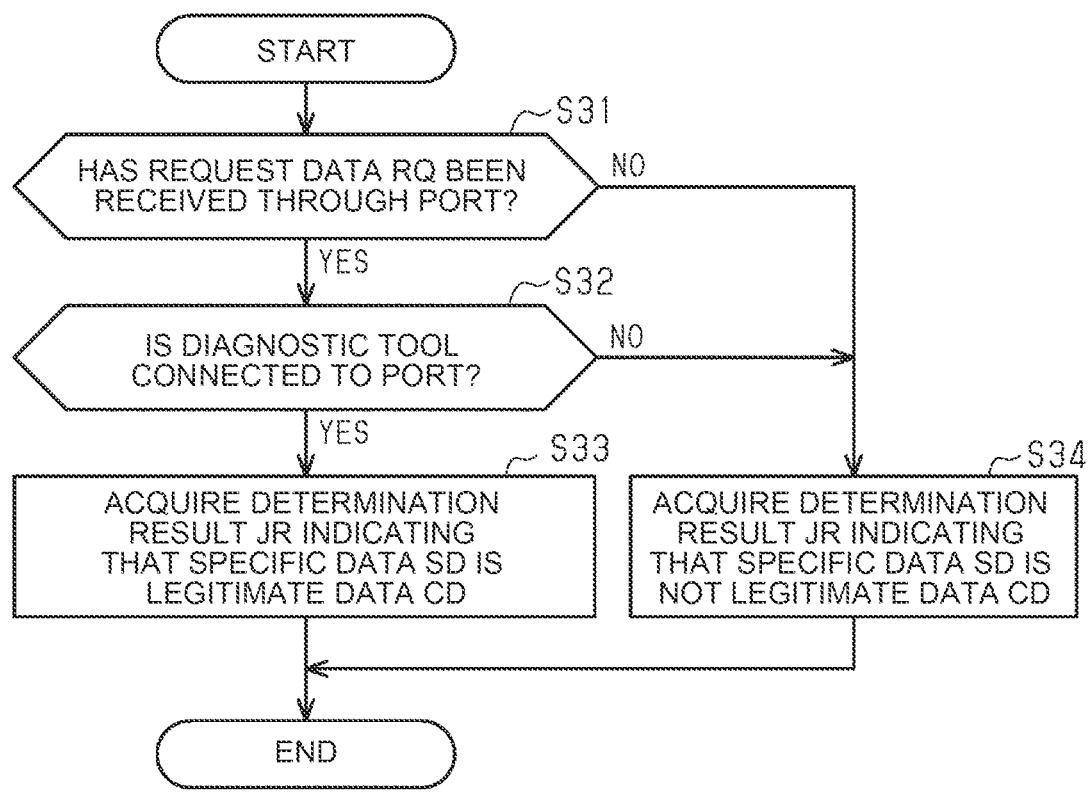
FIG. 4 is a flowchart of a process of monitoring request data by the relay device.

As shown in FIG. 4, when the execution unit 32 has started executing the request data determination program, the execution unit 32 first performs step S31. In step S31, the execution unit 32 determines whether it has received the specific data SD through the port 31. Specifically, the execution unit 32 determines whether it has received the same data as the specific data SD about which the execution unit 32 has been inquired through the port 31 or through the bus 50. When the execution unit 32 has received thorough the bus 50 the same data as the request data RQ that is the specific data SD about which the execution unit 32 has been inquired, the execution unit 32 determines that it has not received the specific data SD about which the execution unit 32 has been inquired through the port 31. When the execution unit 32 has received the specific data SD through the port 31 (S31: YES), the process proceeds to step S32.

In step S32, the execution unit 32 determines whether the diagnostic tool 80 is connected to the port 31. When the diagnostic tool 80 is connected to the port 31 (S32: YES), the process proceeds to step S33.

In step S33, the execution unit 32 determines that the specific data SD about which the execution unit 32 has been inquired is legitimate data CD. The execution unit 32 then acquires a determination result JR indicating that the specific data SD is legitimate data CD. Thereafter, the execution unit 32 ends the series of steps.

On the other hand, when the execution unit 32 has not received the specific data SD through the port 31 (S31: NO), that is, when the execution unit 32 has received the specific data SD through the bus 50, the process proceeds to step S34. When the diagnostic tool 80 is not connected to the port 31 (S32: NO), the process proceeds to step S34.

In step S34, the execution unit 32 determines that the specific data SD about which the execution unit 32 has been inquired is not legitimate data CD. The execution unit 32 then acquires a determination result JR indicating that the specific data SD is not legitimate data CD. Thereafter, the execution unit 32 ends the series of steps.

Monitoring of Response Data

Figure 5:
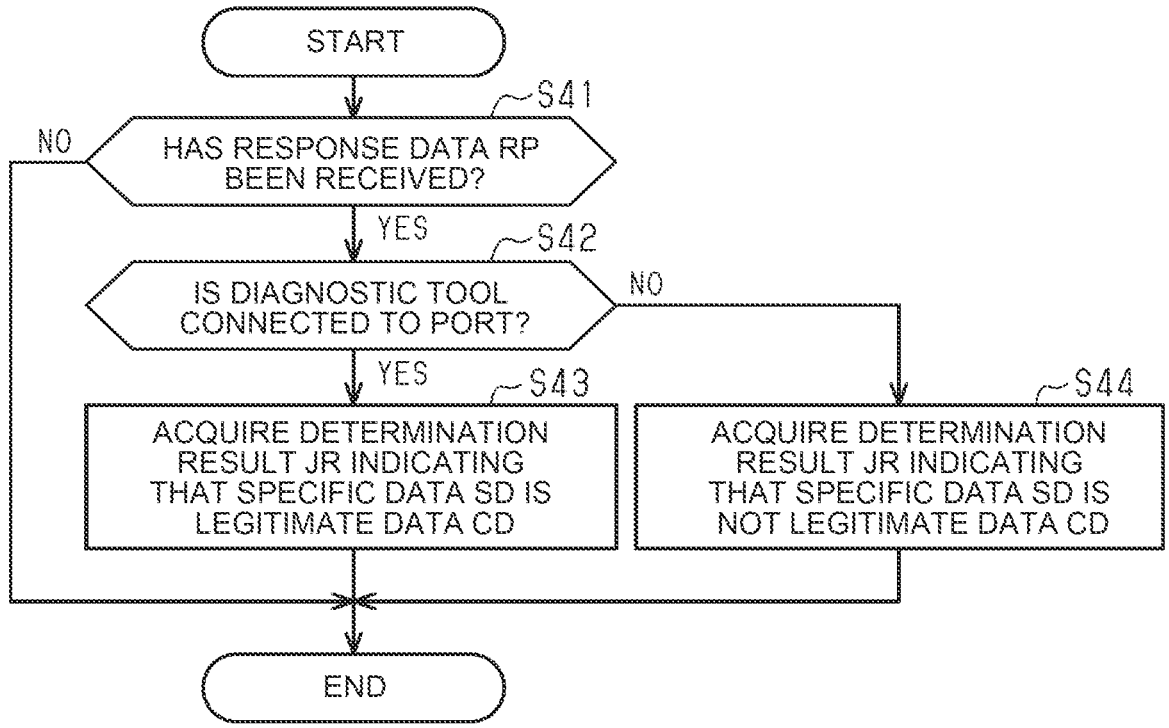
FIG. 5 is a flowchart of a process of monitoring response data by the relay device.

As shown in FIG. 5, when the execution unit 32 has started executing the response data determination program, the execution unit 32 first performs step S41. In step S41, the execution unit 32 determines whether it has received response data RP sent in response to the request data RQ that is the specific data SD about which the execution unit 32 has been inquired. When the execution unit 32 has not received response data RP (S41: NO), the execution unit 32 ends the current series of steps. When the execution unit 32 has received response data RP (S41: YES), the process proceeds to step S42.

In step S42, the execution unit 32 determines whether the diagnostic tool 80 is connected to the port 31. When the diagnostic tool 80 is connected to the port 31 (S42: YES), the process proceeds to step S43.

In step S43, the execution unit 32 determines that the specific data SD corresponding to the response data RP is legitimate data CD. The execution unit 32 then acquires a determination result JR indicating that the specific data SD is legitimate data CD. Thereafter, the execution unit 32 ends the series of steps.

When the diagnostic tool 80 is not connected to the port 31 (S42: NO), the process proceeds to step S44. In step S44, the execution unit 32 determines that the specific data SD about which the execution unit 32 has been inquired is not legitimate data CD. The execution unit 32 then acquires a determination result JR indicating that the specific data SD is not legitimate data CD. Thereafter, the execution unit 32 ends the series of steps.

Connection of Diagnostic Tool

The storage unit 33 stores a tool connection monitoring program for monitoring the connection state of the diagnostic tool 80 to the port 31. The execution unit 32 sends a monitoring result MR including the determination result JR indicating that the specific data SD is not legitimate data CD by executing the monitoring result transmission program. The execution unit 32 then repeatedly executes the tool connection monitoring program at a predetermined cycle during a predetermined period after sending this monitoring result MR.

Figure 6:
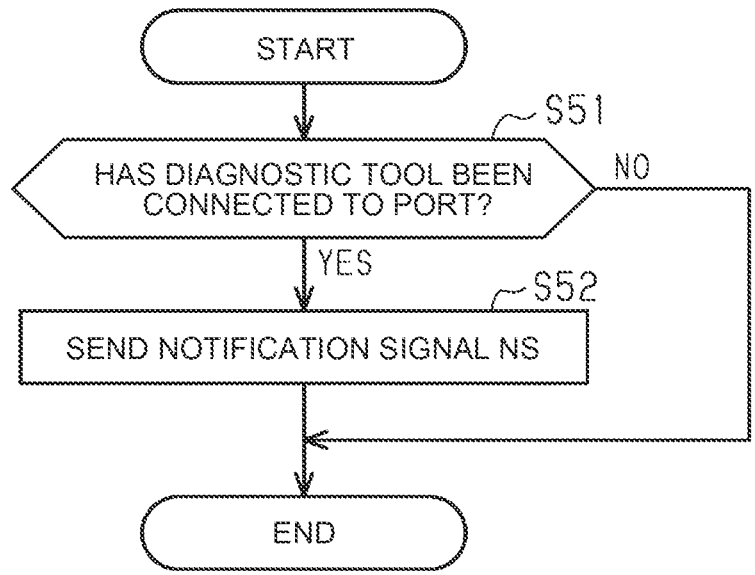
FIG. 6 is a flowchart of a process related to a notification signal that is performed by the relay device.

As shown in FIG. 6, when the execution unit 32 has started executing the tool connection monitoring program, the execution unit 32 first performs step S51. In step S51, the execution unit 32 determines whether the diagnostic tool 80 has been connected to the port 31. When the diagnostic tool 80 has not been connected to the port 31 (S51: NO), the execution unit 32 ends the current series of steps.

When the diagnostic tool 80 has been connected to the port 31 (S51: YES), the process proceeds to step S52. In step S52, the execution unit 32 sends to the diagnosis target device 40A a notification signal NS indicating that the diagnostic tool 80 has been connected to the port 31. The execution unit 32 then ends the current series of steps.

Change to Unlocked State

The storage unit 42A stores an unlock program for cancelling the locked state of the diagnosis target device 40A. The execution unit 41A executes the unlock program in response to the notification signal NS.

Figure 7:
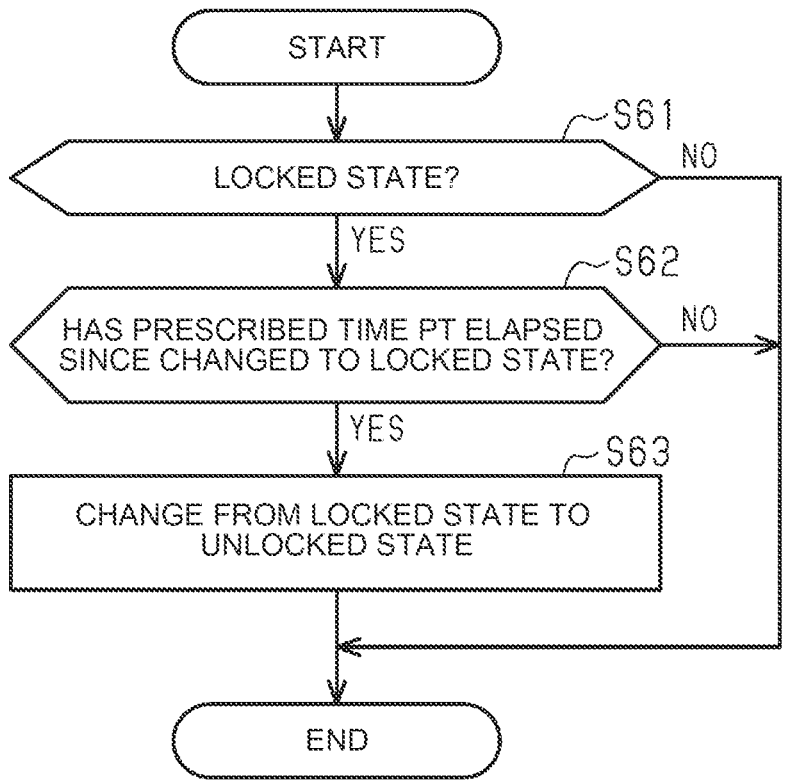
FIG. 7 is a flowchart of a process related to an unlocked state of the diagnosis target device.

As shown in FIG. 7, when the execution unit 41A has started executing the unlock program, the execution unit 41A first performs step S61. In step S61, the execution unit 41A determines whether the communication state of the diagnosis target device 40A is the locked state. The execution unit 41A determines the communication state by referring to the parameter stored in the storage unit 42A and indicating the communication state. When the communication state of the diagnosis target device 40A is not the locked state (S61: NO), the execution unit 41A ends the current series of steps. When the communication state of the diagnosis target device 40A is the locked state (S61: YES), the process proceeds to step S62.

In step S62, the execution unit 41A determines whether a predetermined prescribed time PT has elapsed since the communication state of the diagnosis target device 40A was changed to the locked state. When the prescribed time PT has not elapsed (S62: NO), the execution unit 41A ends the current series of steps. When the prescribed time PT has elapsed (S62: YES), the process proceeds to step S63.

In step S63, the execution unit 41A changes the communication state of the diagnosis target device 40A from the locked state to the unlocked state. Specifically, the execution unit 41A changes the parameter stored in the storage unit 42A and indicating the communication state from the parameter indicating the locked state to the parameter indicating the unlocked state. When the communication state is the unlocked state, the diagnosis target device 40A is able to receive specific data SD. The execution unit 41A then ends the series of steps.

Operations of Embodiment

Figure 8:
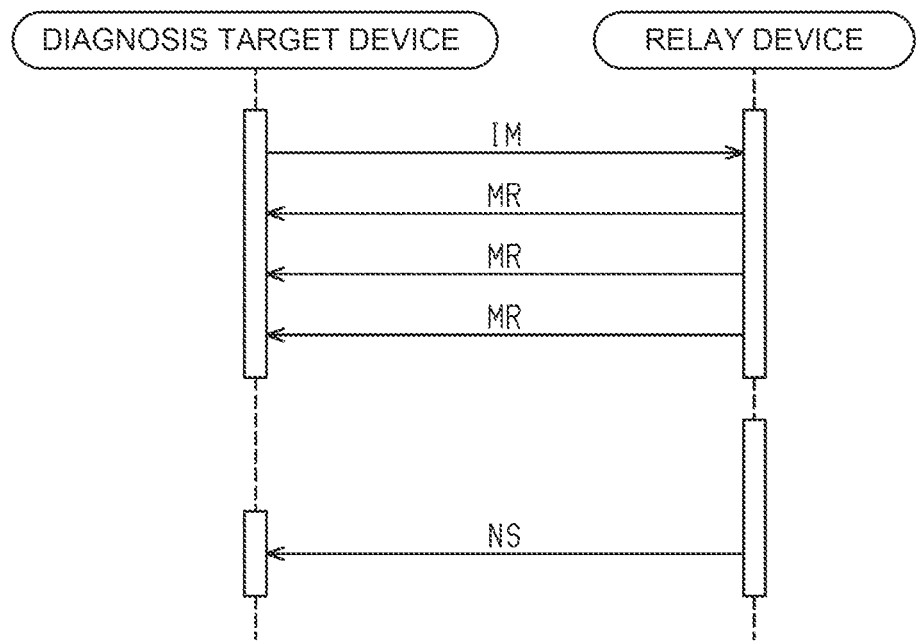
FIG. 8 is a sequence chart illustrating transmission and reception of signals in a communication system.

In the above embodiment, as shown in FIG. 8, the diagnosis target device 40A sends an inquiry signal IM to the relay device 30 when the diagnosis target device 40A has received request data RQ as specific data SD. Specific data SD is normally sent from the diagnostic tool 80 to the diagnosis target device 40A via the relay device 30. In case of an unauthorized access, however, specific data SD is sent to the diagnosis target device 40A without via the relay device 30. In particular, in case that an unauthorized tool is directly connected to the bus 50 to make an unauthorized access, specific data SD is sent to the relay device 30 via the bus 50. In response to the inquiry signal IM, the relay device 30 determines whether the specific data SD is legitimate data CD. The relay device 30 repeatedly sends a monitoring result MR including the determination result JR to the diagnosis target device 40A.

In response to the monitoring result MR, the diagnosis target device 40A changes its communication state to the locked state when the determination result JR included in the monitoring result MR indicates that the specific data SD is not legitimate data CD.

The relay device 30 also monitors connection of the diagnostic tool 80 to the port 31 after sending the monitoring result MR including the determination result JR indicating that the specific data SD is not legitimate data CD. When the diagnostic tool 80 has been connected to the port 31, the relay device 30 sends a notification signal NS to the diagnosis target device 40A. In response to the notification signal NS, the diagnosis target device 40A changes its communication state from the locked state to the unlocked state.

Effects of Embodiment (1) According to the above embodiment, the relay device 30 determines whether the specific data SD is legitimate data CD, in response to an inquiry signal IM received from the diagnosis target device 40A. That is, the relay device 30 can be aware of the data to be monitored and the timing to monitor the data, based on the inquiry signal IM. This configuration can reduce an unnecessary increase in processing load on the relay device 30 in terms of reducing unauthorized accesses.

(2) According to the above embodiment, when the diagnosis target device 40A has received specific data SD whose source appears to be the diagnostic tool 80, the diagnosis target device 40A can receive a monitoring result MR including a determination result JR as to whether the received data is legitimate data. Therefore, in case that the specific data SD is spoofed data with a falsified source, the diagnosis target device 40A can also be aware of this.

(3) The relay device 30 normally receives specific data SD whose source appears to be the diagnostic tool 80 via the port 31. Therefore, when the relay device 30 has received specific data SD whose source appears to be the diagnostic tool 80 via the bus 50, this specific data SD is very likely to be illegal data with a false source. In this regard, in the above embodiment, the relay device 30 determines that the specific data SD is not legitimate data CD on condition that the relay device 30 has received the specific data SD via the bus 50. Therefore, according to the above embodiment, whether the specific data SD received by the diagnosis target device 40A is legitimate data CD from the diagnostic tool 80 can be accurately determined.

(4) The relay device 30 normally receives specific data SD whose source appears to be the diagnostic tool 80 via the port 31. Therefore, when the relay device 30 has received specific data SD whose source appears to be the diagnostic tool 80 via the bus 50, this specific data SD is very likely to be illegal data with a false source. In this regard, in the above embodiment, the relay device 30 determines that the specific data SD is legitimate data CD from the diagnostic tool 80 on condition that the diagnostic tool 80 is connected to the port 31 when the relay device 30 has received an inquiry signal IM. Therefore, according to the above embodiment, whether the specific data SD received by the diagnosis target device 40A is legitimate data CD from the diagnostic tool 80 can be accurately determined.

(5) The diagnostic tool 80 never sends response data RP. The relay device 30 receives legitimate response data RP from the diagnosis target device 40A via the bus 50. It is therefore inappropriate to determine that the specific data SD is not legitimate data CD only on condition that the relay device 30 has received response data RP via the bus 50. In this regard, according to the above embodiment, when the relay device 30 has received response data RP via the bus 50, the relay device 30 determines that the specific data SD corresponding to the response data RP is not legitimate data CD on condition that the diagnostic tool 80 is not connected to the port 31. In other words, the relay device 30 determines that the specific data SD corresponding to the response data RP is not legitimate data CD unless the situation is such that the response data RP is sent in response to request data RQ. The relay device 30 can thus determine that the specific data SD is not legitimate data CD based on the response data RP.

(6) According to the above embodiment, the diagnosis target device 40A changes its communication state to the locked state on condition that the diagnosis target device 40A has received a monitoring result MR including a determination result JR indicating that the specific data SD for which the diagnosis target device 40A has inquired about a monitoring result MR is not legitimate data CD. In the locked state, the diagnosis target device 40A is unable to communicate specific data SD. Accordingly, when specific data SD is not legitimate data CD, communication of the specific data SD and communication of various kinds of data corresponding to the specific data SD are less likely to occur. As a result, illegal data is less likely to be sent and received in response to communication of illegal specific data SD.

(7) According to the above embodiment, the diagnosis target device 40A changes its communication state to the unlocked state on condition that the prescribed time PT has elapsed since the communication state of the diagnosis target device 40A was changed to the locked state. Even if a malicious person attempts an unauthorized access to the diagnosis target device 40A, he or she is very likely to give up quickly if the unauthorized access fails. In other words, it is unlikely that a malicious person will attempt unauthorized accesses over a long period of time. Therefore, as in the above embodiment, after the prescribed time PT has elapsed, problems are less likely to occur even if the communication state of the diagnosis target device 40A is changed to the unlocked state. Since whether the prescribed time PT has elapsed since the communication state of the diagnosis target device 40A was changed to the locked state is used as a criterion for determination, the processing load on the diagnosis target device 40A is minimized.

(8) In the above embodiment, the diagnosis target device 40A changes its communication state to the unlocked state on conditions that the diagnosis target device 40A has received a notification signal NS while its communication state is the locked state and that the prescribed time PT has elapsed since the communication state was changed to the locked state. According to this configuration, the communication state of the diagnosis target device 40A is changed to the unlocked state when the diagnostic tool 80 has been connected to the port 31, that is, when it is probable that legitimate specific data SD will be received. Therefore, when the diagnostic tool 80 is connected in order to legally send and receive data to and from the diagnosis target device 40A, a situation in which the data is unable to be sent and received to and from the diagnosis target device 40A is less likely to occur.

(9) According to the above embodiment, the relay device 30 sends a monitoring result MR to all the control devices 40 to be diagnosed that are connected to the relay device 30 via the same bus 50 as the diagnosis target device 40A. It is herein assumed that the diagnosis target device 40A is a first diagnosis target device and another control device 40 connected to the first bus 50A is a second diagnosis target device. When the first diagnosis target device receives illegal data via the first bus 50A, the second diagnosis target device may also receive illegal data via the first bus 50A. In this regard, according to the above embodiment, the relay device 30 also sends the monitoring result MR to the second diagnosis target device. Therefore, in case that the specific data SD is spoofed data with a falsified source, the second diagnosis target device that has not sent an inquiry signal IM can also be aware of this.

Other Embodiments

The above embodiment can be modified as follows. The above embodiment and the following modifications may be combined as long as no technical contradiction arises.

Overall

The specific data SD is not limited to request data RQ. The specific data SD can be any data whose source appears to be the diagnostic tool 80. For example, the specific data SD may be data indicating a diagnostic result for response data RP. Alternatively, the specific data SD may be data indicating that a diagnosis by the diagnostic tool 80 is going to be started. That is, the specific data SD is not limited to data requesting response data RP.

The monitoring result MR need only include at least a determination result JR. For example, the monitoring result MR may be a message containing both a determination result JR indicating that the specific data SD is not legitimate data CD and data requesting the communication state of the diagnosis target device 40A to be the locked state.

Figure 9:
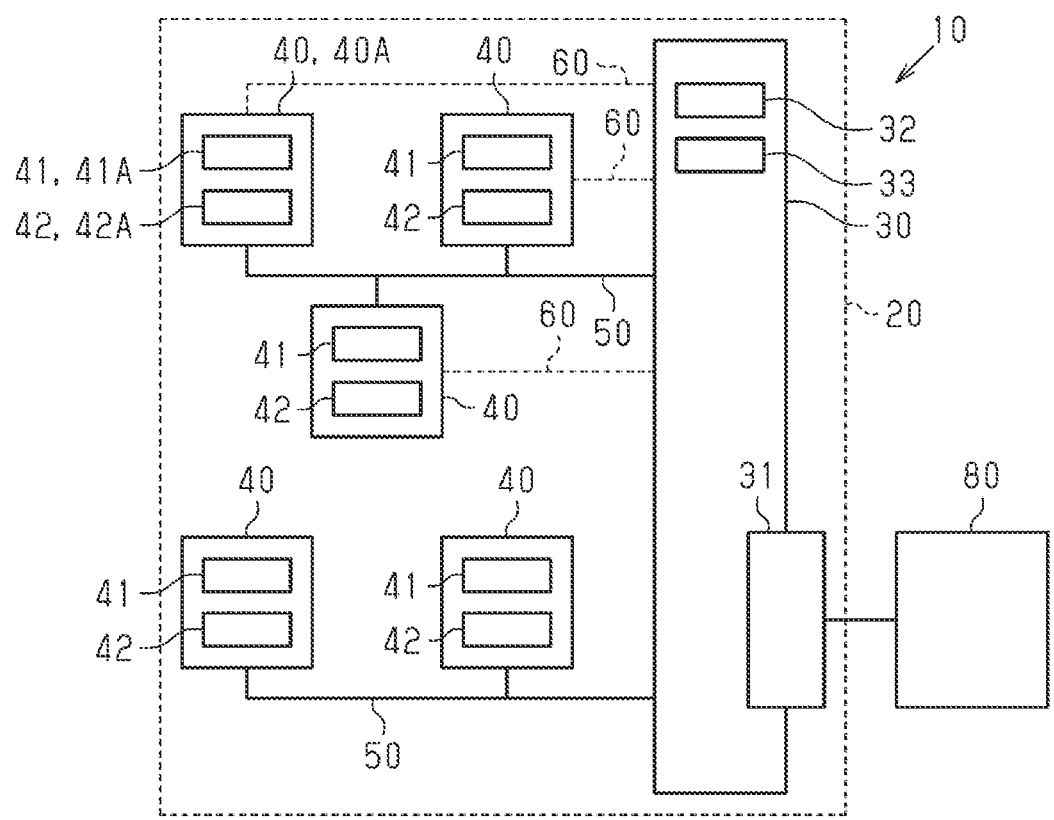
FIG. 9 is a schematic diagram of a communication system according to a modification.

When in the locked state, the diagnosis target device 40A may not receive any data, including the specific data SD, via the bus 50. In this case, for example, as in the example shown in FIG. 9, the diagnosis target device 40A need only be connected to the relay device 30 via another bus 60 in addition to via the first bus 50A. The relay device 30 thus need only send the monitoring result MR via the bus 60. According to this configuration, the relay device 30 sends the monitoring result MR via the bus 60 different from the first bus 50A that may receive illegal data. Therefore, even if the diagnosis target device 40A is controlled not to receive data via the first bus 50A, the diagnosis target device 40A can continuously send the monitoring result MR.

The diagnostic tool 80 can be any so-called diagnostic tool. In the diagnosis using the diagnostic tool 80, response data RP received from the diagnosis target device 40A may only be acquired. In the diagnosis using the diagnostic tool 80, data indicating the result of control performed in response to the request data RQ may be received as response data RP, and some sort of a determination process may be performed based on the response data RP. In other words, any diagnostic process may be performed in the diagnosis using the diagnostic tool 80.

The communication system 20 of the above embodiment may also use such a message authentication code as described in JP 2016-096375 A. This can further reduce unauthorized accesses.

Relay Device

The relay device 30 may be configured as circuitry including one or more processors that perform various processes according to computer programs (software). The relay device 30 may be configured as circuitry including either one or more dedicated hardware circuits, such as an application-specific integrated circuit (ASIC), that perform at least part of the various processes, or a combination thereof. The processor includes a CPU and a memory such as RAM and ROM. The memory stores program codes or commands configured to cause the CPU to perform processes. The memory, that is, a computer-readable medium, includes any available media that can be accessed by a general purpose or special purpose computer. The same applies to the control devices 40.

The relay device 30 may not send a notification signal NS. In this case, the diagnosis target device 40A can change its communication state to the unlocked state without relying on reception of the notification signal NS. In the above embodiment, the relay device 30 determines that the specific data SD is not legitimate data CD when the relay device 30 has received the request data RQ via the bus 50. However, there may be an additional condition(s) for the relay device 30 to determine that the specific data SD is not legitimate data CD. Specifically, one of the conditions for the relay device 30 to determine that the specific data SD is not legitimate data CD may be that the relay device 30 has received the request data RQ via the bus 50.

The relay device 30 may determine whether the specific data SD is legitimate data CD regardless of whether the request data RQ has passed through the bus 50. Specifically, the relay device 30 may determine that the specific data SD is legitimate data CD only on condition that the diagnostic tool 80 is connected to the port 31 when the relay device 30 has received an inquiry signal IM.

In the above embodiment, the relay device 30 uses a plurality of methods to determine whether the specific data SD is legitimate data CD. However, the relay device 30 may use one method to determine whether the specific data SD is legitimate data CD. Specifically, the relay device 30 may execute the request data determination program or the response data determination program in step S21. Therefore, the relay device 30 may not use response data RP to determine whether the specific data SD is legitimate data CD.

The method by which the relay device 30 determines whether the specific data SD is legitimate data CD is not limited to the example in the above embodiment. For example, the relay device 30 may determine whether the specific data SD is legitimate data CD as follows, in addition to or instead of the determination method in the above embodiment. The storage unit 33 of the relay device 30 stores in advance a legitimate data list indicating data contents when the specific data SD is legitimate data CD. At this time, when the execution unit 32 performs step S21, the execution unit 32 may determine that the specific data SD is legitimate data CD on condition that the specific data SD for which the execution unit 32 has been inquired about a monitoring result MR is included in the legitimate data list. According to this, the execution unit 32 can accurately determine whether the specific data SD is legitimate data CD by checking the specific data SD with the legitimate data list.

The relay device 30 may not repeatedly send a monitoring result MR. For example, the relay device 30 may send a monitoring result MR once per determination result JR determined by one method. Alternatively, the relay device 30 may send only once in total a monitoring result MR including results as to whether the specific data SD is legitimate data CD as determination results JR determined by all of the methods.

Diagnosis Target Device

Only one of the control devices 40 may be a device to be diagnosed. The diagnosis target device 40A need not necessarily output response data RP. For example, the diagnosis target device 40A may not output response data RP for a predetermined time after sending an inquiry signal IM. In this case, if the specific data SD is not legitimate data CD, the diagnosis target device 40A is less likely to be driven by illegal data to perform illegal control.

The diagnosis target device 40A may change its communication state to the unlocked state without relying on a notification signal NS and only on condition that the prescribed time PT has elapsed since the communication state was changed to the locked state. Even in this case, any attempt for unauthorized access is blocked because the locked state is maintained for the prescribed time PT.

The diagnosis target device 40A may change its communication state to the unlocked state regardless of whether the prescribed time PT has elapsed and only on condition that the diagnosis target device 40A has received a notification signal NS. That is, the diagnosis target device 40A may change its communication state in response to a notification signal NS.

The diagnosis target device 40A may not change its communication state to the locked state when the diagnosis target device 40A has received a monitoring result MR including a determination result JR indicating that the specific data SD is not legitimate data CD. For example, the diagnosis target device 40A may receive specific data SD, but may not perform control based on the received specific data SD.

RELATED TECHNICAL IDEAS

The following are technical ideas that can be grasped from the above embodiment and modifications.

APPENDIX I

A communication system comprising:
a relay device including a port configured to connect a diagnostic tool; and
a first diagnosis target device connected to the relay device via a first bus, wherein
the first diagnosis target device is configured to, when the first diagnosis target device has received specific data whose source appears to be the diagnostic tool, send an inquiry signal for inquiring of the relay device about a monitoring result for the specific data, and
the relay device is configured to
 determine in response to the inquiry signal whether the specific data is legitimate data from the diagnostic tool, and
 send the monitoring result including a determination result to the first diagnosis target device.

APPENDIX II

The communication system according to Appendix I, wherein the relay device is configured to determine that the specific data is not the legitimate data from the diagnostic tool on condition that the relay device has received the specific data via the first bus.

APPENDIX III

The communication system according to Appendix I or II, wherein the relay device is configured to determine that the specific data is the legitimate data from the diagnostic tool on condition that the diagnostic tool is connected to the port when the relay device has received the inquiry signal.

APPENDIX IV

The communication system according to any one of Appendixes I to III, wherein:
the first diagnosis target device is configured to output response data to the diagnostic tool in response to the specific data; and
the relay device is configured to determine that the specific data corresponding to the response data is not the legitimate data from the diagnostic tool on condition that the diagnostic tool is not connected to the port when the relay device has received the response data.

APPENDIX V

The communication system according to any one of Appendixes I to IV, wherein:
the relay device includes a storage unit and an execution unit;
the storage unit stores a legitimate data list indicating data contents when the specific data is the legitimate data; and
the execution unit is configured to send the monitoring result indicating that the specific data is the legitimate data to the first diagnosis target device on condition that the specific data is included in the legitimate data list.

APPENDIX VI

The communication system according to any one of Appendixes I to V, wherein the first diagnosis target device is configured to change a communication state of the first diagnosis target device to a locked state on condition that the first diagnosis target device has received the monitoring result including the determination result indicating that the specific data is not the legitimate data, the locked state being a state in which at least communication of the specific data is disabled.

APPENDIX VII

The communication system according to Appendix VI, wherein the first diagnosis target device is configured to change the communication state of the first diagnosis target device to an unlocked state on condition that a predetermined time has elapsed since the communication state of the first diagnosis target device was changed to the locked state, the unlocked state being a state in which communication of the specific data is enabled.

APPENDIX VIII

The communication system according to Appendix VII, wherein:
the relay device is configured to, when the diagnostic tool is connected to the port, send to the first diagnosis target device a notification signal indicating that the diagnostic tool has been connected to the port; and
the first diagnosis target device is configured to, when the communication state of the first diagnosis target device is the locked state, change the communication state of the first diagnosis target device to the unlocked state on conditions that the first diagnosis target device has received the notification signal and that the predetermined time has elapsed since the communication state of the first diagnosis target device was changed to the locked state.

APPENDIX IX

The communication system according to any one of Appendixes VI to VIII, wherein:
the first diagnosis target device is connected to the relay device via a second bus in addition to via the first bus;
the first diagnosis target device is configured not to communicate data via the first bus when in the locked state; and
the relay device is configured to send the monitoring result to the first diagnosis target device via the second bus.

APPENDIX X

The communication system according to any one of Appendixes I to IX, further comprising a second diagnosis target device, wherein:
the second diagnosis target device is connected to the relay device via the first bus; and
the relay device is configured to send the monitoring result to the second diagnosis target device.

What is claimed is:

1. A communication system comprising:
a relay device including a port configured to connect a diagnostic tool; and
a first diagnosis target device connected to the relay device via a first bus, wherein
the first diagnosis target device is configured to, when the first diagnosis target device has received specific data whose source appears to be the diagnostic tool, send an inquiry signal for inquiring of the relay device about a monitoring result for the specific data, and
the relay device is configured to
determine in response to the inquiry signal whether the specific data is legitimate data from the diagnostic tool, and
send the monitoring result including a determination result to the first diagnosis target device.

2. The communication system according to claim 1, wherein the relay device is configured to determine that the specific data is not the legitimate data from the diagnostic tool on condition that the relay device has received the specific data via the first bus.

3. The communication system according to claim 1, wherein the relay device is configured to determine that the specific data is the legitimate data from the diagnostic tool on condition that the diagnostic tool is connected to the port when the relay device has received the inquiry signal.

4. The communication system according to claim 1, wherein:
the first diagnosis target device is configured to output response data to the diagnostic tool in response to the specific data; and
the relay device is configured to determine that the specific data corresponding to the response data is not the legitimate data from the diagnostic tool on condition that the diagnostic tool is not connected to the port when the relay device has received the response data.

5. The communication system according to claim 1, wherein:
the relay device includes a storage unit and an execution unit;
the storage unit stores a legitimate data list indicating data contents when the specific data is the legitimate data; and
the execution unit is configured to send the monitoring result indicating that the specific data is the legitimate data to the first diagnosis target device on condition that the specific data is included in the legitimate data list.

6. The communication system according to claim 1, wherein the first diagnosis target device is configured to change a communication state of the first diagnosis target device to a locked state on condition that the first diagnosis target device has received the monitoring result including the determination result indicating that the specific data is not the legitimate data, the locked state being a state in which at least communication of the specific data is disabled.

7. The communication system according to claim 6, wherein the first diagnosis target device is configured to change the communication state of the first diagnosis target device to an unlocked state on condition that a predetermined time has elapsed since the communication state of the first diagnosis target device was changed to the locked state, the unlocked state being a state in which communication of the specific data is enabled.

8. The communication system according to claim 7, wherein:
the relay device is configured to, when the diagnostic tool is connected to the port, send to the first diagnosis target device a notification signal indicating that the diagnostic tool has been connected to the port; and
the first diagnosis target device is configured to, when the communication state of the first diagnosis target device is the locked state, change the communication state of the first diagnosis target device to the unlocked state on conditions that the first diagnosis target device has received the notification signal and that the predetermined time has elapsed since the communication state of the first diagnosis target device was changed to the locked state.

9. The communication system according to claim 6, wherein:
the first diagnosis target device is connected to the relay device via a second bus in addition to via the first bus;
the first diagnosis target device is configured not to communicate data via the first bus when in the locked state; and
the relay device is configured to send the monitoring result to the first diagnosis target device via the second bus.

10. The communication system according to claim 1, further comprising a second diagnosis target device, wherein:
the second diagnosis target device is connected to the relay device via the first bus; and
the relay device is configured to send the monitoring result to the second diagnosis target device.

11. A relay device comprising a port configured to connect a diagnostic tool, wherein the relay device is configured to
determine whether specific data whose source appears to be the diagnostic tool is legitimate data from the diagnostic tool when the relay device has received, from a diagnosis target device to be diagnosed by the diagnostic tool, an inquiry signal for inquiring about a monitoring result for the specific data, and send the monitoring result including a determination result to outside via a communication bus different from the port.

12. A diagnosis target device configured to connect via a bus to a relay device including a port configured to connect a diagnostic tool in order for the diagnosis target device to be diagnosed by the diagnostic tool, and send an inquiry signal for inquiring of the relay device about a monitoring result for specific data whose source appears to be the diagnostic tool when the diagnosis target device has received the specific data.

\* \* \* \* \*